United States Patent [19]
Kuehn

[11] Patent Number: 5,065,570
[45] Date of Patent: * Nov. 19, 1991

[54] BI-FOLD HAY RAKE SYSTEM

[76] Inventor: Melvin C. Kuehn, Rte. 3, Box 272, Aitkin, Minn. 56431

[*] Notice: The portion of the term of this patent subsequent to Aug. 14, 2007, has been disclaimed.

[21] Appl. No.: 537,247

[22] Filed: Jun. 13, 1990

Related U.S. Application Data

[63] Continuation of Ser. No. 445,891, Nov. 24, 1989, Pat. No. 4,947,631, which is a continuation of Ser. No. 126,690, Feb. 24, 1988, abandoned.

[51] Int. Cl.⁵ .............................................. A01D 78/12
[52] U.S. Cl. ...................................... 56/377; 56/379; 56/384
[58] Field of Search ................. 56/370, 377, 376, 379, 56/384, 396, 397, 15.5; 171/63, 65

[56] References Cited

U.S. PATENT DOCUMENTS

| | | | |
|---|---|---|---|
| 4,214,428 | 7/1980 | Caraway | 56/377 |
| 4,753,063 | 6/1988 | Buck | 56/377 |
| 4,932,197 | 6/1990 | Allan | 56/377 |
| 4,974,407 | 12/1990 | Rowe et al. | 56/377 |

OTHER PUBLICATIONS

"Crop-Driven Fingerwheel Rakes", Vicon Corporation, undated.

*Primary Examiner*—Terry L. Melius
*Attorney, Agent, or Firm*—Haugen and Nikolai

[57] ABSTRACT

This invention relates to the improvement of a new hay rake system that utilizes two separate wheel-type rakes which are substantially merged into one by mounting them to fold in for traveling and fold out for the raking position.

4 Claims, 2 Drawing Sheets

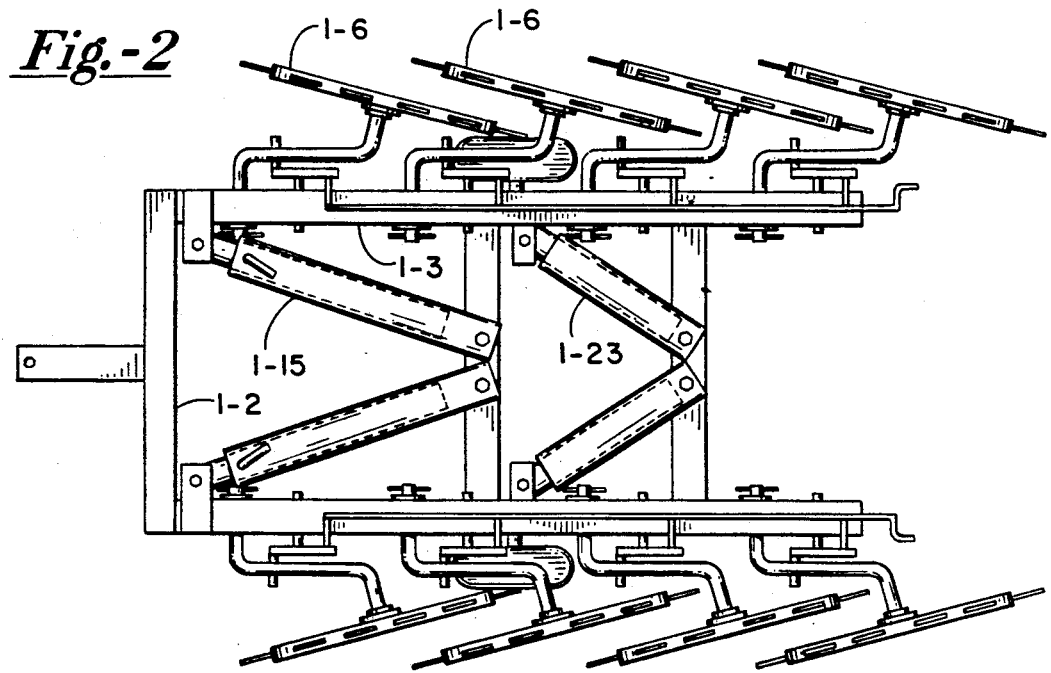
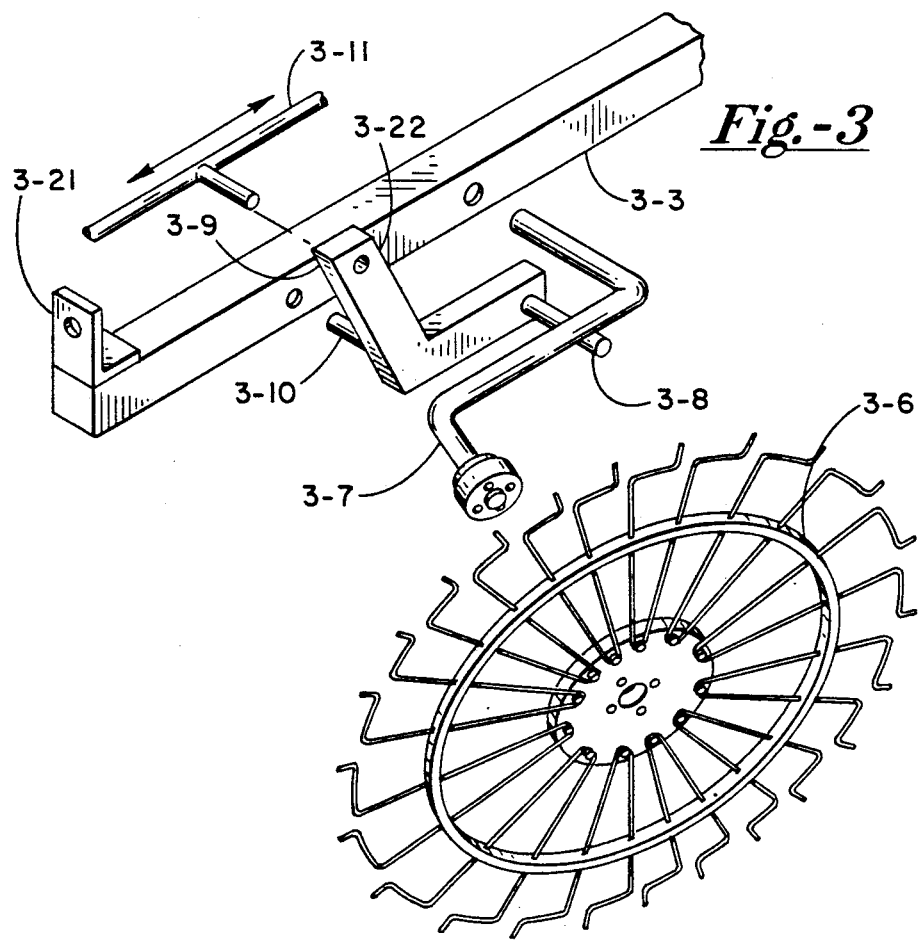

BI-FOLD HAY RAKE SYSTEM

This is a continuation of copending application Ser. No. 07/445,631, now U.S. Pat. No. 4,947,691, filed on Nov. 24, 1989 which was a continuation of application Ser. No. 07/126,690, filed Feb. 24, 1988, now abandoned.

BACKGROUND

The harvesting of grass or forage crops namely making hay, comprises of cutting the grass or forage and then leaving it lie on the ground for drying, thereby curing. This period of time is determined by the elements of the weather, which usually takes about 48 hours. At this period of time the dried or cured grass becomes hay. At this particular time it is very important to put the hay up as soon as possible. To put the hay up too soon results in too much moisture in the hay, causing molding, rotting and serious deterioration to the hay. If it is left lying on the ground too long, it readily becomes parched and the nutrients, especially protein, decreases rapidly. The hay making industry has long recognized the wheel type rakes, such as cited in U.S. Pat. Nos. 3,516,238 and 3,841,070, as a useful and workable method of raking hay. It also recognizes that the more wheels added to a given frame, making a larger rake, the more valuable time saved. This time saved is in relation to its size and bulk. However, the larger the rake the more diffucult to hook the rake to a power vehicle and the more difficult it is in transporting the rake from one field to another. Here-in lies the problem. Presently, the industry uses two complete and separate rakes by hooking them up in gang fashion or by an opposing position. The rakes that traverse the hay to the center as cited in U.S. Pat. No. 4,185,447 and other wheel-type rakes, do so only with considerable amount of work and delay, especially in transporting the rakes from one field to another. The Bi-Fold rake system contained herein addresses this particular problem.

SUMMARY OF THE INVENTION

The Bi-Fold rake system is an invention which relates to the improvement in the hay raking machinery. This is accomplished by combining two frames with wheel rakes attached to one moveable transport frame in such a manner that it comprises two rakes in one. The transporting problem is resolved by the unique feature the rake possesses by folding out for the raking or field position. This is accomplished by the use of a unique set of folding braces which have a telescoping feature.

BRIEF DESCRIPTION OF DRAWINGS

FIG. 1-6 are attached to the support beams FIG. 1-3 by the wheel rake arms FIG. 1-7. The support beams are connected to the support braces FIG. 1-15 and FIG. 1-23 at point FIG. 1-4, 1-12 and to the transport frame FIG. 1-2 at point FIG. 1-13. The support braces telescope and are adjustable at points FIG. 1-14 and FIG. 1-16 by inserting a pin. The support braces are attached to the transport frame at points FIG. 1-19 and FIG. 1-20. They rest on, but are not connected to the transport frame at points FIG. 1-17 and 1-18 holding up the support frame. The telescoping feature of the support braces vary the distance between points FIG. 1-4 and FIG. 1-5, thereby describing the width or swath the rake can be expanded. The wheels FIG. 1-7 are attached to the transport frame in a conventional manner, thereby constituting the trailer transport system by hooking up to a power vehicle at point FIG. 1-1. FIGS. 1-8, 1-9, 1-10 and 1-11 make up the mechanism for raising and lowering the wheel rake assemblies as described in FIG. 3.

FIG. 2 is a top view of the Bi-Fold rake system in a folded or transport position. The support beams FIG. 1-3 with the wheel rake assemblies FIG. 1-6 attached, are resting on top or parallel and they coincide with the transport frame FIG. 1-2. The hypotenuse side of the triangle FIG. 1-15 and FIG. 1-23 formed is in the contracted position. The number and arrangement of the wheel rakes can vary and is obvious to the novice and no claims are being made as part of this invention.

FIG. 3 is a disassembled view of a section of the support beam FIG. 3-3 where the wheel rake FIG. 3-6 is attached. FIG. 3 is a given section of the support beam as depicted in FIG. 1-3. This support beam has the wheel rake assembly FIG. 3-6 attached to it by the wheel rake arm FIG. 3-7. The wheel rake is raised or lowered by a rotating action of the actuating arm FIG. 3-9 the stopping pin FIG. 3-8 which prevents the wheel rake arm from dropping too low because of the supporting action of the stopping pin, yet it allows free upward motion of the wheel rake arm which is connected to the wheel rake at the hub of the wheel. By moving the connecting rod FIG. 3-11 in a forward or backward motion which is connected to the actuating arm at FIG. 3-22, it rotates the actuating arm around the shaft FIG. 3-10, resulting in the stopping pin pushing against the wheel rake arm and raising or lowering the wheel rake assembly. The connecting rod is threaded at point FIG. 3-21 in a conventional manner and this distance can be varied by other conventional methods by a hydraulic cylinder or whatever, and is not part of this invention.

DETAILED DESCRIPTION OF THE INVENTION

Figure 1:
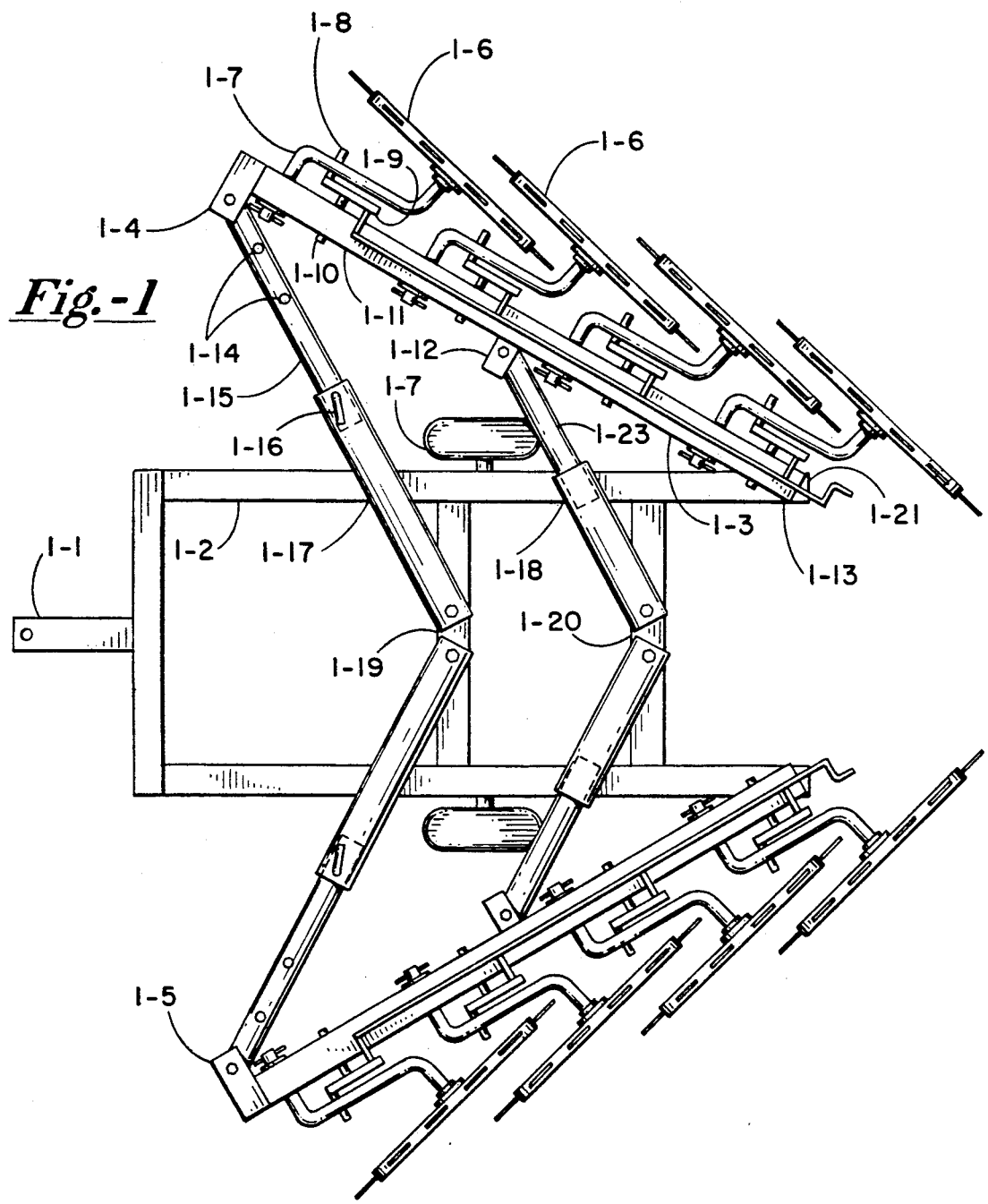
FIG. 1 is a top view of the Bi-Fold Hay Rake System in the expanded or raking position. The wheel rake assemblies

It has been discovered that two rakes can be comprised into one by the use of a set of support beams FIG. 1-3 and folding braces FIG. 1-15 and FIG. 1-23 that are attached to a standard type frame as depicted in FIG. 1 by folding in or out. The support beam attached to the transport frame at point FIG. 1-13 is the apex of the triangle formed. The support beams attached at FIG. 1-4 and FIG. 1-12 are the vertex of the triangle formed and the telescoping braces FIG. 1-15 and FIG. 1-23 are the hypotenuse side of the triangle. Furthermore, the support braces hold up the support beams by resting on the transport frame FIG. 1-2 at points FIG. 1-17 and FIG. 1-18 but is made possible only by connecting at points FIG. 1-19 and FIG. 1-20 and not at the resting points as these points must be allowed to vary. The support beam forms a right triangle in relation to the support braces when in the folded or transport position. As the support beams fold out and the hypotenuse side, which is the telescoping braces, extend an oblique triangle is formed. Furthermore, the unique feature of the telescoping hypotenuse side of the triangle formed permits the rake to be adjustable in width from FIG. 1-5 to FIG. 1-4, this is important and useful because if the hay is too heavy (thick) the operator can adjust the raking width to suit the existing conditions by inserting a pin FIG. 1-16 at a point FIG. 1-14, for example. The Bi-Fold action of the braces gives the rake the ability to rake from both sides towards the center. This is important and useful in as much as to rake hay for a lateral distance of 24 feet makes it very difficult because the amount of hay, that has to traverse that distance would accumulate into a large amount of hay creating a plugging of the hay raking machine. By employing the Bi-Fold rake system that is: raking from both sides toward the center, the hay has to traverse only half the distance or for 12 feet versus 24 feet, for example. While this has been attempted as cited in U.S. Pat. No. 4,185,447 it does not solve the transport problem. The transport frame assembly FIG. 1-2 with the wheels (tires) located at point FIG. 1-7 permits the manufacturer to build in a conventional trailer like manner so as to adjust the weight of the hay rake machine on the tongue FIG. 1-1 where it hooks up to the power vehicle. By balancing the hay rake over the tires it permits the operator to hook up with ease and simplicity. It also allows the operator to tow the Bi-Fold rake with his pickup, for example, at speeds up to 50 mph. The wheel rakes attached to the support beams which are connected to the transport frame at points FIG. 1-13 and to the telescoping support braces at points FIG. 1-4 and FIG. 1-12 the braces rest at points FIG. 1-17 and FIG. 1-18 but are connected at points FIG. 1-19 and FIG. 1-20 actually comprise a complete hay rake system when mounted on a conventional trailer type frame, as depicted in FIG. 1.

Referring to FIG. 3 as depicted in a disassembled view, the wheel rakes FIG. 3-6 are attached to the wheel rake arm FIG. 3-7 can be raised or lowered with a unique actuating arm FIG. 3-9 with a stopping pin FIG. 3-8 that supports the wheel rake arm. This actuating arm, as depicted, can raise or lower the wheel rakes by virtue of its own weight, yet provides free upward movement of the wheel rake. This feature is accomplished by actuating the arm forward or backward at point FIG. 3-22 of the actuating arm either mechanically or hydraulically.

This feature is important and useful because it raises the wheel rakes into road or traveling position, yet it has the ability to lower the wheel rake for raking purposes but will not force the wheel rake to be lowered too far, allowing the wheel rake to possibly drag on the ground and become damaged. Furthermore, the actuating arm FIG. 3-9 makes tedding hay possible by raising the wheel rakes just high enough so that it can be allowed to pass over and remove the top half of the hay in the windrow, thereby letting the sun dry the bottom half of the windrow. This is a very desirable feature in slow drying weather. Furthermore, this dual purpose of raking and tedding the hay eliminates the cost and maintenance of a second machine.

The above mentioned features, as illustrated, are exemplary in nature and are not to be construed as limitations of the present invention as set forth in the following claims.

It is hereby claimed:

1. An agricultural implement adapted for towing behind a tractor or the like to rake a harvested crop arranged in a swath along the ground into a windrow, comprising:
   (a) a transport frame having a front end and a rear end, a frame centerline extending between said front and rear ends, and a pair of spaced apart, side supports on opposite sides of said centerline;
   (b) ground engaging wheels operably coupled to said transport frame for supporting said frame along the ground; and
   (c) a pair of wheel rake assemblies operably mounted on each side of said transport frame for shifting between a folded transport position and an extended working position, each of said wheel rake assemblies having a support beam pivotally coupled to said transport frame at a respective support beam pivot point proximal said rear end and a plurality of wheel rakes rotatably carried along the length of said support beam;
   (d) each wheel rake assembly including an extensible support arm assembly, each of said support arm assemblies including a first support brace pivotally coupled at one end thereof to said support frame at a respective first support brace pivot point forward of said support beam pivot points and proximal said centerline, said first support braces each extending across a respective side support in slidable relationship therewith to a respective wheel rake assembly support beam such that each of said wheel rake assemblies is supported at least at three points by said transport frame.

2. The bi-fold hay rake system as defined in claim 1 wherein each of said support arm assemblies include a second support brace rearwardly spaced from, and generally parallel to, said first support brace, said second support braces each being pivotally coupled at one end thereof to said support frame at a respective second support brace pivot point forward of said support beam pivot points and proximal said centerline, said second support braces each extending across a respective side support in slidable relationship therewith to a respective support beam such that each of said wheel assemblies is supported at least at five points by said transport frame.

3. The bi-fold hay rake system as defined in claim 2 wherein each of said support beams have a first end and a second end and a middle portion therebetween, said first ends being pivotally coupled to said transport frame at said respective support beam pivot points, each of said first support braces being pivotally coupled to a respective support beam second end.

4. The bi-fold hay rake system as defined in claim 3 wherein each of said second support braces being pivotally coupled to the middle portion of a respective support beam.

* * * * *